United States Patent Office 3,775,432
Patented Nov. 27, 1973

3,775,432
EPITHIO DIENAMIDES
John B. Siddall and Clive A. Henrick, Palo Alto, Calif.,
assignors to Zoecon Corporation, Palo Alto, Calif.
No Drawing. Original application Feb. 1, 1971, Ser. No.
111,674, now Patent No. 3,723,462, dated Mar. 27,
1973. Divided and this application Aug. 18, 1972, Ser.
No. 281,669
Int. Cl. C07d 59/00
U.S. Cl. 260—327 E          7 Claims

ABSTRACT OF THE DISCLOSURE

Novel epithio substituted hydrocarbon esters, derivatives thereof, and amides having diunsaturation, synthesis thereof, useful for the control of insects.

---

This is a division of application Ser. No. 111,674, filed Feb. 1, 1971 now U.S. Pat. No. 3,723,462 issued Mar. 27, 1973.

This invention relates to novel unsaturated aliphatic hydrocarbon esters, amides and derivatives thereof useful for the control of insects of the following Formula A:

$$R^4-\underset{\underset{S}{\diagdown\diagup}}{C}-CH-(CH_2)_n-\underset{|}{C}H-(CH_2)_m-CH=CH-\underset{|}{C}=CH-R^5$$
$$\qquad\quad\; R^3 \qquad\qquad\quad R^2 \qquad\qquad\qquad R^1 \qquad\qquad (A)$$

wherein,
$R^1$ is hydrogen or alkyl;
Each of $R^2$, $R^3$ and $R^4$ is alkyl;
$m$ is zero or the positive integer one, two or three;
$n$ is the positive integer one, two or three; and
$R^5$ is one of the groups:

$$-\underset{\|}{\overset{O}{C}}-OR^6 \text{ or } -\underset{\|}{\overset{O}{C}}-N\diagdown_{R^8}^{R^7}$$

or
in which $R^6$ is hydrogen, alkyl, cycloalkyl, aralkyl or metal cation; and each of $R^7$ and $R^8$ is hydrogen, alkyl, cycloalkyl, aralkyl, phenyl, alkenyl, hydroxyalkyl, alkoxyalkyl or, when taken together with the nitrogen atom to which they are attached, pyrrolidino, morpholino, piperidino, piperazino or 4-alkylpiperazin.

The compounds of Formula A are useful for the control of insects. The compounds are applied using either liquid or solid carriers, such as water, acetone, cottonseed oil, xylene, mineral oil, silicon, talc, natural and synthetic resins, and the like. Generally, compositions for application will contain up to about 75% of the active compound and more usually less than 25%, sufficient composition should be applied to provide from about 0.1 to 25 micrograms of the active compound per insect. Typical insects controlled by the present invention are Diptera, such as mosquitos and houseflies; Hemiptera, such as Pyrrhocoridae and Miridae; and Coleoptera, such as Tenebrionidae, Crysomelidae and Dermestidae. For example, *Pyrrhocoris apterus, Lygus hesperus, Tenebrio molitor, Triboleum confusm, Diabrotica duodecimpunctata, Dermestes maculatus, Aedes aegypti* and *Musca domestica*. Without any intention of being bound by theory, the compounds of Formula A are believed to be effective by reason of hormonal action in that unlike conventional insecticides which are effective by reason of causing immediate death, the compounds of Formula A are effective by reason of physiological changes caused in the treated insect which result in eventual death of the insect and/or inability of the treated insect to reproduce by reason of sterility or abnormal development.

In the description hereinafter, each of $R^1$ through $R^8$, $m$ and $n$ is as defined hereinabove.

The compounds of Formula A can be prepared according to the following outlined process.

$$R^4-\underset{\underset{O}{\diagdown\diagup}}{C}-CH-(CH_2)_n-\underset{|}{C}H-(CH_2)_m-CH=CH-\underset{|}{C}=CH-R^5$$
$$\qquad\quad\; R^3 \qquad\qquad\quad R^2 \qquad\qquad\qquad R^1 \qquad\qquad (B)$$

$$\downarrow$$

$$R^4-\underset{\underset{S}{\diagdown\diagup}}{C}-CH-(CH_2)_n-\underset{|}{C}H-(CH_2)_m-CH=CH-\underset{|}{C}=CH-R^5$$
$$\qquad\quad\; R^3 \qquad\qquad\quad R^2 \qquad\qquad\qquad R^1 \qquad\qquad (A)$$

In the practice of the above process, an epoxide of Formula B is reacted with potassium thiocyanate or ammonium thiocyanate in an organic solvent, such as lower alcohol, e.g. ethanol, to yield an episulfide of Formula A. The reaction is usually done above room temperature to reflux temperature of the reaction mixture.

The compounds of Formula B are prepared as described in our copending applications Ser. Nos. 111,766 now abandoned and 111,769, filed on even date, entitled "Novel Compositions" and "Novel Products," respectively, the disclosures of which are hereby incorporated by reference.

The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, naphthylmethyl and naphthylethyl.

The term "alkyl," as used herein, refers to a straight or branched chain saturated aliphatic hydrocarbon group having a chain lenth of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl. The term "hydroxyalkyl," as used herein, refers to an alkyl group substituted with one hydroxy group, e.g. hydroxymethyl, p-hydroxyethyl and 4-hydroxypentyl. The term "alkoxyalkyl," as used herein, refers to an alkyl substituted with one alkoxy group, e.g. methoxymethyl, 2-methoxyethyl, 4-ethoxybutyl, n-propoxyethyl and t-butylethyl. The term "alkenyl," as used herein, refers to an ethylenically unsaturated hydrocarbon group, branched or straight chain, having a chain length of two to twelve carbon atoms, e.g. allyl, vinyl, 3-butenyl, 2-butenyl, 2-hexenyl and i-propenyl. Whenever any of the foregoing terms are modified by the word "lower," the chain length of the group is not more than six carbon atoms with the exception of lower alkoxyalkyl in which event a total chain length of twelve carbon atoms is the maximum.

The following examples are provided to illustrate the practice of the present invention. Temperature is given in degrees centigrade.

EXAMPLE 1

To 0.60 g. of ethyl 10,11-oxido-3,7,11-trimethyldodeca-2,4-dienoate in 25 ml. of absolute ethanol is added 5 ml. of water and 1.0 g. of potassium thiocyanate. The mixture is heated at reflux for about 65 hours. Refluxing is stopped and the mixture poured into brine and extracted with ether. The ethereal extract is washed with brine, dried and evaporated to yield ethyl 10,11-epithio-3,7,11-trimethyldodeca-2,4-dienoate which can be purified by thin layer chromatography or distillation under vacuum.

The above process is repeated using each of the unsaturated esters under Column I to prepare the respective compound under Column II.

3

(I)

ethyl 10,11-oxido-3,7,11-trimethyltrideca-2,4-dienoate,
ethyl 10,11-oxido-3,11-dimethtyl-7-ethyltrideca-2,4-dienoate,
ethyl 10,11-oxido-7,11-diethyl-3-methyltrideca-2,4-dienoate,
ethyl 10,12-oxido-3,8,12-trimethyltrideca-2,4-dienoate,
ethyl 9,10-oxido-3,7,10-trimethylundeca-2,4-dienoate,
ethyl 9,10-oxido-3,7,10-trimethyldodeca-2,4-dienoate,
ethyl 9,10-oxido-3,6,10-trimethylundeca-2,4-dienoate,
ethyl 10,11-oxido-7,11-dimethyltrideca-2,4-dienoate,
ethyl 10,11-oxido-11-methyl-7-ethyltrideca-2,4-dienoate,
ethyl 10,11-oxido-7,11-diethyltrideca-2,4-dienoate,
ethyl 11,12-oxido-8,12-dimethyltrideca-2,4-dieonate,
ethyl 9,10-oxido-7,10-dimethylundeca-2,4-dienoate,
ethyl 9,10-oxido-7,10-dimethyldodeca-2,4-dienoate, and
ethyl 9,10-oxido-6,10-dimethylundeca-2,4-dienoate.

(II)

ethyl 10,11-epithio-3,7,11-trimethyltrideca-2,4-dienoate,
ethyl 10,11-epithio-3,11-dimethyl-7-ethyltrideca-2,4-dienoate,
ethyl 10, 11-epithio-7,11-diethyl-3-methyltrideca-2,4-dienoate,
ethyl 11,12-epithio-3,8,12-trimethyltrideca-2,4-dienoate,
ethyl 9,10-epithio-3,7,10-trimethylundeca-2,4-dienoate,
ethyl 9,10-epithio-3,7,10-trimethyldodeca-2,4-dienoate,
ethyl 9,10-epithio-3,6,10-trimethylundeca-2,4-dienoate,
ethyl 10,11-epithio-7,11-dimethyltrideca-2,4-dienoate,
ethyl 10,11-epithio-11-methyl-7-ethyltrideca-2,4-dienoate,
ethyl 10,11-epithio-7,11-diethyltrideca-2,4-dienoate,
ethyl 11,12-epithio-8,12-dimethyltrideca-2,4-dienoate,
ethyl 9,10-epithio-7,10-dimethylundeca-2,4-dienoate,
ethyl 9,10-epithio-7,10-dimethyldodeca-2,4-dienoate, and
ethyl 9,10-epithio-6,10-dimethylundeca-2,4-dienoate.

EXAMPLE 2

The process of Example 1 is repeated with the exception of using each of the amides under Column III as the starting material to prepare the respective compound under Column IV.

(III)

N,N-diethyl 10,11-oxido-3,7,11-trimethyldodeca-2,4-dienamide,
N,N-diethyl 10,11-oxido-3,7,11-trimethyltrideca-2,4-dienamide,
N,N-diethyl 10,11-oxido-3,11-dimethyl-7-ethyltrideca-2,4-dienamide,
N,N-diethyl 10,11-oxido-3-methyl-7,11-diethyltrideca-2,4-dienamide,
N,N-diethyl 11,12-oxido-3,8,12-trimethyltrideca-,2,4-dienamide,
N,N-diethyl 9,10-oxido-3,7,10-trimethylundeca-2,4-dienamide,
N,N-diethyl 9,10-oxido-3,7,10-trimethyldodeca-2,4-dienamide,
N,N-diethyl 9,10-oxido-3,6,10-trimethylundeca-2,4-dienamide,
N,N-diethyl 10,11-oxido-7,11-dimethyldodeca-2,4-dienamide,
N,N-diethyl 10,11-oxido-7,11-dimethyltrideca-2,4-dienamide,
N,N-diethyl 10,11-oxido-7-ethyl-11-methyltrideca-2,4-dienamide,
N,N-diethyl 10,11-oxido-7,11-diethyltrideca-2,4-dienamide,
N,N-diethyl 11,12-oxido-8,12-dimethyltrideca-2,4-dienamide,
N,N-diethyl 9,10-oxido-7,10-dimethylundeca-2,4-dienamide,
N,N-diethyl 9,10-oxido-7,10-dimethyldodeca-2,4-dienamide, and
N,N-diethyl 9,10-oxido-6,10-dimethylundeca-2,4-dienamide.

4

(IV)

N,N-diethyl 10,11-epithio-3,7,-11-trimethyldodeca-2,4-dienamide,
N,N-diethyl 10,11-epithio-3,7,11-trimethyltrideca-2,4-dienamide,
N,N-diethyl 10,11-epithio-3,11-dimethyl-7-ethyltrideca-2,4-dienamide,
N,N-diethyl 10,11-epithio-3-methtyl-7,11-diethyltrideca-2,4-dienamide,
N,N-diethyl 11,12-epithio-3,8,12-trimethyltrideca-2,4-dienamide,
N,N-diethyl 9,10-epithio-3,7,10-trimethylundeca-2,4-dienamide,
N,N-diethyl 9,10-epithio-3,7,10-trimethyldodeca-2,4-dienamide,
N,N-diethyl 9,10-epithio-3,6,10-trimethylundeca-2,4-dienamide,
N,N-diethyl 10,11-epithio-7,11-dimethyldodeca-2,4-dienamide,
N,N-diethyl 10,11-epithio-7,11-dimethtyltrideca-2,4-dienamide,
N,N-diethyl 10,11-epithio-7-ethyl-11-methyltrideca-2,4-dienamide,
N,N-diethyl 0,11-epithio-7,11-diethyltrideca-2,4-dienamide,
N,N-diethyl 11,12-epithio-8,12-dimethyltrideca-2,4-dienamide,
N,N-diethyl 9,10-epithio-7,10-dimethylundeca-2,4-dienamide,
N,N-diethyl 9,10-epithio-7,10-dimethyldodeca-2,4-dienamide, and
N,N-diethyl 9,10-epithio-6,10-dimethylundeca-2,4-dienamide.

EXAMPLE 3

Each of the esters under Column V is used as the starting material in Example 1 in methanol to prepare the respective compounds under Column VI:

(V)

methyl 10,11-oxido-3,7,11-trimethyltrideca-2,4-dienoate,
methyl 10,11-oxido-3,11-dimethyl-7-ethyltrideca-2,4-dienoate,
methyl 10,11-oxido-3-methyl-7,11-diethyltrideca-2,4-dienoate,
methyl 10,11-oxido-3,8,12-trimethyltrideca-2,4-dienoate,
methyl 11,12-oxido-3,7,10-trimethylundeca-2,4-dienoate,
methyl 9,10-oxido-3,7,10-trimethyldodeca-2,4-dienoate, and
methyl 9,10-oxido-3,6,10-trimethylundeca-2,4-dienoate.

(VI)

methyl 10,11-epithio-3,7,10-trimethyldodeca-2,4-dienoate,
methyl 10,11-epithio-3,7,11-trimethyltrideca-2,4-dienoate,
methyl 10,11-epithio-3,11-dimethyl-7-ethyltrideca-2,4-dienoate,
methyl 10,11-epithio-3-methyl-7,11-diethyltrideca-2,4-dienoate,
methyl 11,12-epithio-3,8,12-trimethyltrideca-2,4-dienoate,
methyl 9,10-epithio-3,7,10-trimethylundeca-2,4-dienoate,
methyl 9,10-epithio-3,7,10-trimethyldodeca-2,4-dienoate, and
methyl 9,10-epithio-3,6,10-trimethylundeca-2,4-dienoate.

EXAMPLE 4

Each of benzyl 10,11-oxido - 3,7,11 - trimethyltrideca-2,4-dienoate, isopropyl 10,11-oxido - 3,7,11 - trimethyldodeca-2,4-dienoate, cyclohexyl 10,11-oxido-3,7,11-trimethyldodeca-2,4-dienoate and n-hexyl 9,10-oxido-trimethylundeca-2,4-dienoate is used as the starting material in the procedure of Example 1 to prepare the respective episulfide, that is benzyl 10,11-epithio - 3,7,11 - trimethyltrideca - 2,4 - dienoate, isopropyl 10,11-epithio-3,7,11-trimethyldodeca - 2,4 - dienoate, cyclohexyl 10,11-epithio-3,7,11 - trimethyldodeca - 2,4 - dienoate, and n-hexyl 9,10-epithio-3,7,10-trimethylundeca-2,4-dienoate.

EXAMPLE 5

Each of N,N-dimethyl 10,11-oxido - 3,7,11 - trimethyltrideca - 2,4 - dienamide, N-methyl 10,11-oxido-3,7,11-trimethyltrideca - 2,4 - dienamide, N,N-isopropyl 10,11-oxido - 3,7,11 - trimethyltrideca - 2,4 - dienamide, and N,N-di-n-butyl 10,11 - oxido - 3,7,11 - trimethyldodeca-2,4-dienamide is used as the starting material in the process of Example 1 to prepare the respective compound, that is N,N - dimethyl 10,11 - epithio - 3,7,11 - trimethyltrideca - 2,4 - dienamide, N-methyl 10,11-epithio-3,7,11-trimethyltrideca - 2,4 - dienamide, N,N-isopropyl 10,11-epithio - 3,7,1 - trimethyltrideca - 2,4 - dienamide, and N,N-di-n-butyl 10,11 - epithio - 3,7,11 - trimethyldodeca-2,4-dienamide.

EXAMPLE 6

To a mixture of 2 g. of trans ethyl 3,7,11-trimethyldodeca - 2,4,10 - trienoate in 150 ml. of methylene chloride at 0° is slowly added 1.0 molar equivalent of m-chloroperbenzoic acid in 100 ml. of methylene chloride. The resulting mixture is allowed to stand for 30 minutes at 0° and then washed with 2% aqueous sodium bisulfite solution, with 5% aqueous sodium bicarbonate solution and with water, dried over sodium sulfate and evaporated to yield trans ethyl 10,11 - oxido - 3,7,11 - trimethyldodeca-2,4-dienoate, which is purified by chromatography.

What is claimed is:

1. A compound selected from those of the following Formula A:

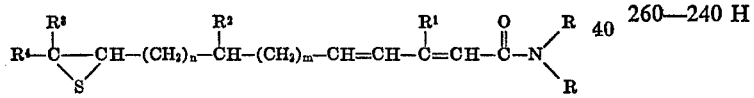

wherein $R^1$ is hydrogen or alkyl of 1 to 22 carbon atoms;

each of $R^2$, $R^3$ and $R^4$ is alkyl of 1 to 12 carbon atoms;

$m$ is zero or the positive integer one, two or three;

$n$ is the positive integer one, two or three;

each of $R^7$ and $R^8$ is hydrogen alkyl of 1 to 12 carbon atoms, cycloalkyl of 4 to 8 carbon atoms, aralkyl of 7 to 12 carbon atoms, phenyl, alkenyl of 2 to 12 carbon atoms, hydroxyalkyl of 1 to 12 carbon atoms, alkoxyalkyl, wherein each alkyl is of 1 to 12 carbon atoms or, when taken together with the nitrogen atom to which they are attached, pyrrolidino, morpholino, piperidino, piperazino or 4-alkyl-piperazino, wherein the alkyl is of 1 to 12 carbon atoms.

2. A compound according to claim 1 wherein each of $R^7$ and $R^8$ is hydrogen, methyl or ethyl; $R^1$ is hydrogen or methyl; each of $R^2$ and $R^3$ is methyl or ethyl and $R^4$ is lower alkyl.

3. A compound according to claim 2 where $m$ is one; $n$ is one two and $R^4$ is methyl or ethyl.

4. A compound according to claim 3 wherein $R^1$ is hydrogen and $n$ is two.

5. A compound according to claim 3 wherein $R^1$ is methyl and $n$ is two.

6. A compound according to claim 4 wherein each of $R^2$, $R^3$ and $R^4$ is methyl.

7. A compound according to claim 5 wherein each of $R^2$, $R^3$ and $R^4$ is methyl.

References Cited

UNITED STATES PATENTS

| | | | |
|---|---|---|---|
| 2,729,634 | 1/1956 | Dearborn | 260—239.5 |
| 2,845,438 | 7/1958 | Dearborn | 260—327 |

HENRY R. JILES, Primary Examiner

C. M. S. JAISLE, Assistant Examiner

U.S. Cl. X.R.

260—240 H

UNITED STATES PATENT OFFICE
CERTIFICATE OF CORRECTION

Patent No. 3,775,432         Dated Nov. 27, 1973

Inventor(s) John B. Siddall and Clive.A. Henrick

It is certified that error appears in the above-identified patent and that said Letters Patent are hereby corrected as shown below:

Claim 1, that portion of the formula reading

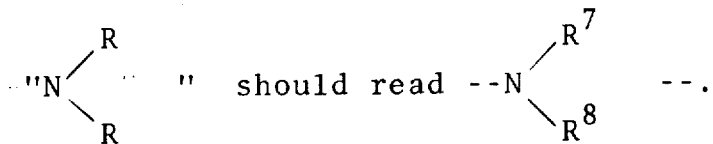

Signed and sealed this 16th day of July 1974.

(SEAL)
Attest:

McCOY M. GIBSON, JR.　　　　　　　　C. MARSHALL DANN
Attesting Officer　　　　　　　　　　Commissioner of Patents